United States Patent
McDonough et al.

(10) Patent No.: US 7,295,632 B2
(45) Date of Patent: Nov. 13, 2007

(54) METHOD AND APPARATUS FOR DECODING PUNCTURED SUBFRAMES

(75) Inventors: John G. McDonough, La Jolla, CA (US); Jane Wang, San Diego, CA (US); Gibong Jeong, San Diego, CA (US); Der-Chieh Koon, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 692 days.

(21) Appl. No.: 10/392,511

(22) Filed: Mar. 20, 2003

(65) Prior Publication Data
US 2004/0184567 A1 Sep. 23, 2004

(51) Int. Cl.
*H04L 27/06* (2006.01)

(52) U.S. Cl. .................................................... 375/340

(58) Field of Classification Search ................ 375/340, 375/316; 341/50, 81; 714/746, 699, 799
See application file for complete search history.

(56) References Cited

U.S. PATENT DOCUMENTS

| 5,555,024 | A * | 9/1996 | Limberg | 348/473 |
| 6,983,166 | B2 * | 1/2006 | Shiu et al. | 455/522 |
| 2003/0128674 | A1 * | 7/2003 | Kong et al. | 370/320 |

* cited by examiner

*Primary Examiner*—Pankaj Kumar
(74) *Attorney, Agent, or Firm*—Ronald O. Neerings; Wade J. Brady, III; Frederick J. Telecky, Jr.

(57) ABSTRACT

System and method for decoding punctured subframes. A preferred embodiment comprises a first deinterleaver unit (for example, 5-ms deinterleaver 502) and a second deinterleaver unit (for example, 20-ms deinterleaver 504) operating in parallel, deinterleaving one symbol stream using 5- and 20-ms duration frame formats, for example. After the reception of each 5-ms subframe, the subframe is decoded in a decode unit (for example, rate matching, decoding, and CRC checking (RDC) unit 530) to verify that the subframe contains 5 ms duration frame data. If so, the subframe is noted. If all 5-ms subframes in a 20-ms duration frame contain 5-ms duration data, no decoding of results by the second deinterleaver unit is needed. If the entire 20-ms duration frame is not all 5-ms duration data, then the 5-ms duration data subframes are zeroed and the remaining data is decoded as 20-ms duration data.

31 Claims, 5 Drawing Sheets

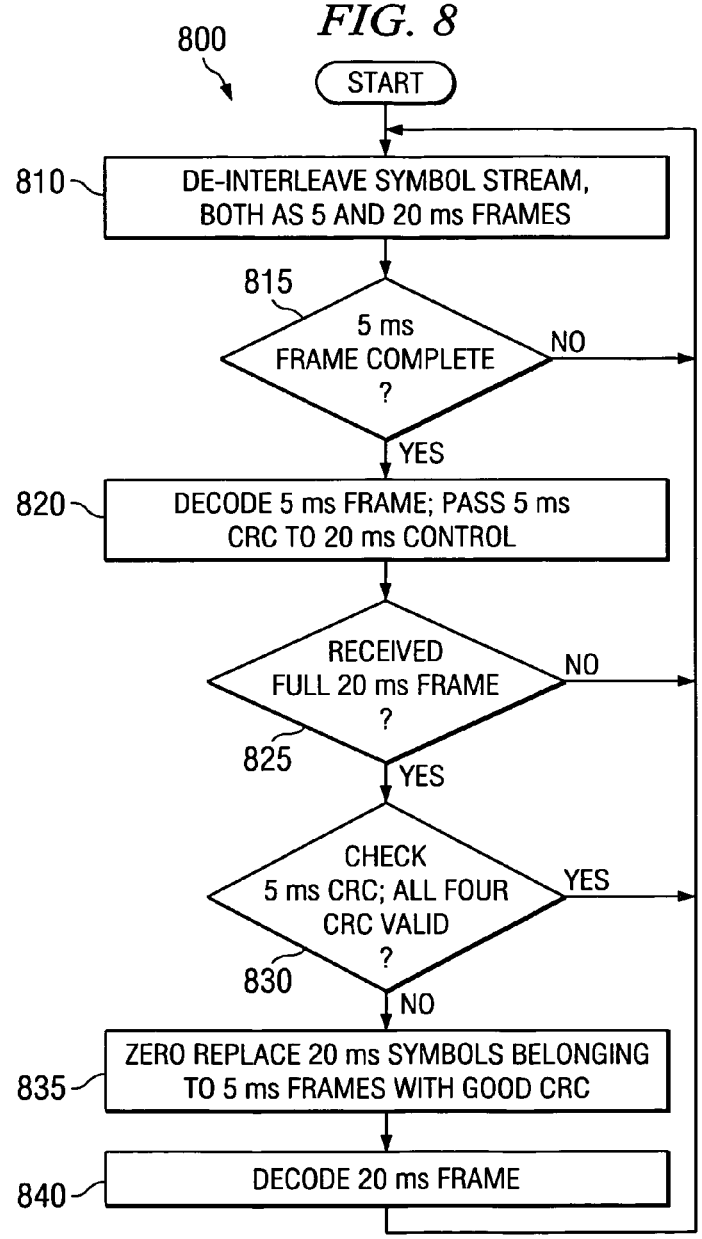
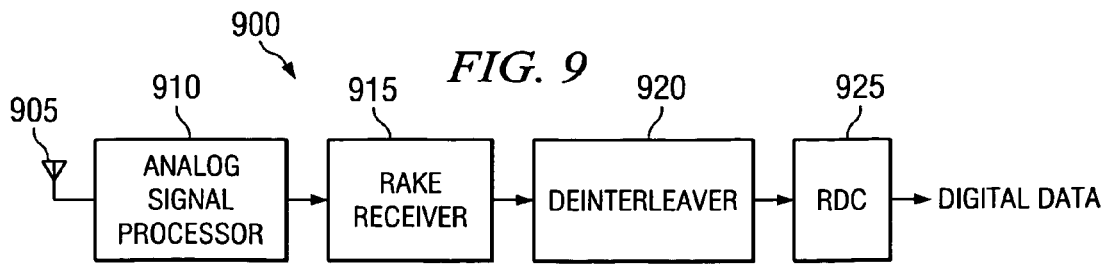

METHOD AND APPARATUS FOR DECODING PUNCTURED SUBFRAMES

TECHNICAL FIELD

The present invention relates generally to a system and method for digital communications, and more particularly to a system and method for decoding a frame of data wherein a smaller frame of data may have been inserted.

BACKGROUND

The use of wireless telephones and communications systems has become so widespread that they have become a fixture in everyday life. A significant percentage of the population subscribes to wireless telephone and/or communications service of one form or another. Wireless devices now offer more than simple voice. The user may be able to send and receive messages, browse the Internet, access computer networks, and so forth on a wireless device that is connected to a wireless communications system.

To support such a wide variety of different services, a large amount of data must be received at and transmitted from a wireless device and some of that data must arrive at the wireless device in a timely fashion. Data that is urgent in nature may often be sent at a higher priority than typical data. This highly urgent data may be sent at the expense of typical data. An example of high urgency message is a message that contains media-access control (MAC) state transitions. Its timely reception may be vital to the continued operation of the wireless device.

Some wireless communications systems support the use of messages with different frame durations. In such systems, typical communications will transmit data in frames of a specified duration and for messages of high-urgency, a shorter duration frame may be used. Shorter duration frames may be used to ensure that the high-urgency message be transmitted as soon as possible and to minimize disruption to normal message traffic. In an IS-2000 compliant communications system, for example, data is normally transmitted in frames with a 20 millisecond (ms) duration. However, highly urgent messages can be transmitted in a shorter duration frame. The shorter duration frame has a five (5) ms duration.

When the shorter duration frame is transmitted, it may simply be inserted into a first available 5 ms subframe of the 20 ms frame, obliterating any data that was in that particular 5 ms subframe. This method of transmission is referred to as puncturing, wherein the 20 ms frame has been punctured by the 5 ms frame. Unfortunately, the puncturing of the 20 ms frame by the 5 ms frame can make it more difficult to decode the frames at the receiver, especially if no frame duration indicator or flag is asserted. When no indication as to the currently arriving data's frame duration is provided in the signaling, the receiver does not know if it has received a 5 ms frame or a 20 ms frame. Therefore, receiver design may need to be made more complex when frame puncturing is supported.

A relatively straight forward approach to decoding received signals in a communications system that permits frame puncturing involves receiving each 5 ms subframe and decoding the 5 ms subframe as a 5 ms frame. At the same time, the received signal is buffered so that information is not lost in case the received data is actually part of a 20 ms frame. Then, when a complete 20 ms frame (four 5 ms subframes) have been received and it is determined that at least one of the 5 ms subframes is actually part of a 20 ms frame, the buffered data (with any actual 5 ms frame data eliminated) is decoded. If none of the four 5 ms subframes contain 20 ms frame data, then the 20 ms frame decoding need not be performed.

One disadvantage of the prior art is the decoding of the 20 ms frame cannot start until all four 5 ms subframes have been processed. This requires a 20 ms buffer which adds costs and increases power consumption.

A second disadvantage of the prior art is that once the four 5 ms subframes have been processed, the 20 ms frame decoding cannot begin until additional post deinterleave processing to the 20 ms frame data is performed. This adds additional latency to the 20 ms frame decoding.

A third disadvantage of the prior art is that additional hardware in the form of a burst post-processing deinterleaver, an additional memory interface, additional decoders, control hardware, and so forth is needed.

A fourth disadvantage of the prior art is that if during the frame transmission the transmitter enters discontinuous mode (DTX) after transmitting a 5 ms frame, the receiver cannot turn off its power to reduce power consumption.

A fifth disadvantage of the prior art is that although the shorter duration frame, for example, 5 ms, is always decoded, the majority of the data being received by the wireless device is in the longer duration frame format, for example, 20 ms. Therefore, a large amount of unnecessary processing is being performed.

SUMMARY OF THE INVENTION

These and other problems are generally solved or circumvented, and technical advantages are generally achieved, by preferred embodiments of the present invention which provide a method and apparatus for decoding frames of received data that may or may not be punctured by smaller frames of data.

In accordance with a preferred embodiment of the present invention, a method for deinterleaving a data stream, wherein the data stream can be partitioned into portions of a first and second size, wherein there are M portions of the first size in a portion of the second size, the method comprising deinterleaving a portion of the first size of the data stream at a first and a second frame duration, determining if the portion of the first size of the data stream deinterleaved with the first frame duration is valid, repeating the deinterleaving and determining until M portions of the first size has been received, and decoding the M portions of the first size as a data frame of the second frame duration if any of the M portions of the first size was determined to be invalid.

In accordance with another preferred embodiment of the present invention, a circuit comprising a symbol stream input, a first deinterleaver unit coupled to the symbol stream input, the first deinterleaver unit containing circuitry to deinterleave symbols from the symbol stream at a first frame duration rate, a second deinterleaver unit coupled to the symbol stream input, the second deinterleaver containing circuitry to deinterleave symbols from the symbol stream at a second frame duration rate, and a decode unit coupled to the first and second deinterleaver units, the decode unit containing circuitry to determine the integrity of a data frame provided by the first and second deinterleaver units.

In accordance with another preferred embodiment of the present invention, a receiver comprising a signal source, an analog processing circuit coupled to the signal source, the analog processing circuit containing circuitry to filter and amplify a signal provided by the signal source and produce received data, a deinterleaver unit coupled to the analog processing circuit, the deinterleaver unit containing circuitry to deinterleave an output of the analog processing circuit and produce a deinterleaved symbol stream, wherein the received data may contain punctured data, and a rate match, decode, and CRC check (RDC) circuit coupled to the deinterleaver unit, the digital processing circuit containing circuitry to decode, error detect, and error correct the deinterleaved symbol stream to produce a digital data stream An advantage of a preferred embodiment of the present invention is that the decoding of a longer duration frame (for example, 20 ms) and a shorter duration frame (for example, 5 ms) are performed in real-time with no longer duration frame post process delay. This reduces the overall system latency.

A further advantage of a preferred embodiment of the present invention is that the longer duration frame data (for example, 20 ms) does not need to be buffered and additional functional and control hardware is not needed. Therefore, the present invention requires very little additional hardware to implement.

Yet another advantage of a preferred embodiment of the present invention is that the present invention can shut down its 20 ms frame or 5 ms subframe deinterleaving after it is determined that the transmitter has entered discontinuous transmission. This can result in significant reductions in power consumption.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 8 is a diagram illustrating a process for controlling a deinterleaver and RDC unit with the capability to deinterleave data frames of a first duration which may contain data frames of a second duration punctured into the data frames of the first duration, according to a preferred embodiment of the present invention; and FIG. 9 is a diagram illustrating a high-level view of a wireless receiver, wherein the wireless receiver features a deinterleaver capable of deinterleaving a symbol stream that may contain punctured data frames without any frame duration indicators or flags, according to a preferred embodiment of the present invention.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an IS-2000 compliant wireless communications receiver. An overview of the IS-2000 technical standard is provided in a document entitled "Introduction to cdma2000 Spread Spectrum Systems, Release 0," which is herein incorporated by reference. The pertinent section of the IS-2000 technical standard is specified in a document entitled "Medium Access Control (MAC) Standard for cdma2000 Spread Spectrum Systems, Release A—Addendum 2," which is herein incorporated by reference. The invention may also be applied, however, to other communications systems receivers (both wired and wireless) that support multiple frame durations without indicators as to which frame the currently transmitted data belongs. Additionally, while the specifications discus specific frame durations of five and 20 milliseconds, the present invention supports various combinations of frame durations.

Figure 1:
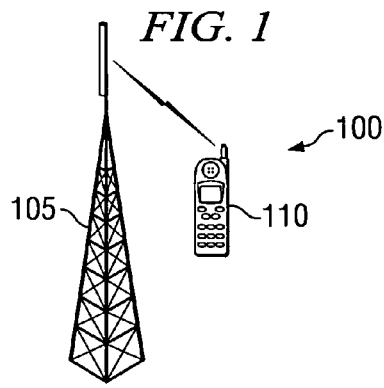
FIG. 1 is a diagram illustrating a portion of a wireless communications system.

With reference now to FIG. 1, there is shown a diagram illustrating a portion of a wireless communications system 100. The portion of the Wireless communications system 100 includes a cell site 105 and a wireless device 110. In a complete wireless communications system, one would expect a larger number of cell sites and wireless devices connected to the cell sites. The wireless device 110 may be as simple as a basic cellular telephone which may serve only as a voice communications device. Alternatively, the wireless device 110 may be a two-way pager, an enhanced cellular telephone that supports voice and data applications, a computer (or personal digital assistant (PDA)) that can use the wireless communications system as a wireless computer network, and so forth.

An example of an advanced wireless communications system is a code-division multiple access cellular system that is based on the IS-2000 technical standard, a third generation wireless cellular communications standard.

IS-2000 compliant wireless communications systems support voice, high-speed data, and multimedia applications via a wide variety of wireless devices.

One feature of IS-2000 compliant communications networks is that although transmissions typically occur in data frames with a 20 ms duration, when a need arises, a 5 ms duration frame can puncture the 20 ms duration frame. Puncturing is simply the replacement of data from a portion of the 20 ms duration frame with data from the 5 ms duration frame. As specified in the technical standard, the 20 ms duration frame is broken into four 5 ms subframes and the 5 ms duration frame can take place of any of the 5 ms subframes. If more than one 5 ms duration frames are to be sent, then it is possible for all four 5 ms subframes within a single 20 ms duration frame to be replaced with 5 ms duration frames. The replacement of a 5 ms subframe with a 5 ms duration frame will be discussed in more detail below.

The 5 ms duration frame (sometimes referred to as a mini-message) can be used to transmit high-urgency messages to a receiver. An example of a high-urgency message that may be transmitted using a 5 ms duration frame that punctures a 20 ms duration frame is a message that conveys a media-access control (MAC) state transition to the receiver. The high-urgency message can be transmitted with minimal wait (the start of a next 5 ms subframe), rather than having to wait until the completion of the entire 20 ms duration frame. This can reduce the overall latency in the transmission of the 5 ms duration frame.

Figure 2:
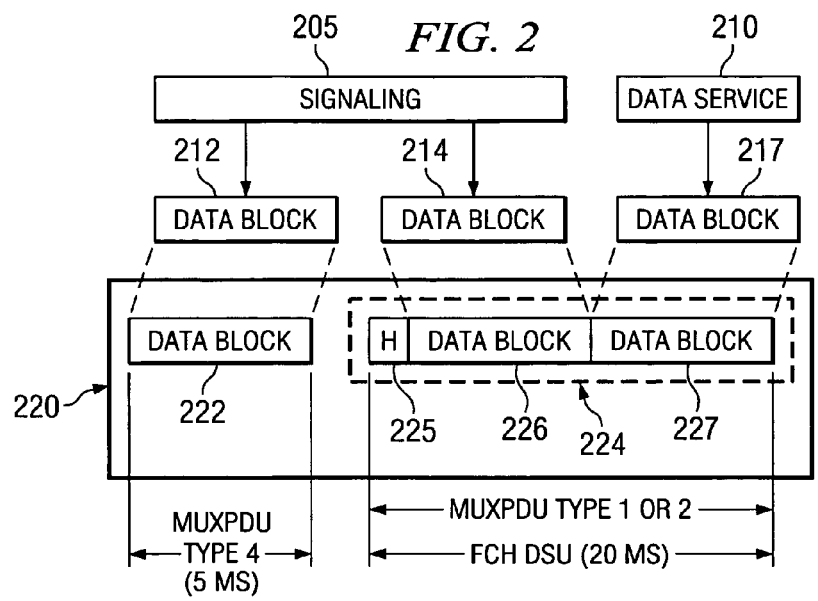
FIG. 2 is a diagram illustrating a data multiplex layer and a possible structuring of a 5 ms duration frame punctured within a 20 ms duration frame.

With reference now to FIG. 2, there is shown a diagram illustrating a data multiplex layer 220 and a possible structuring of a 5 ms duration frame punctured within a 20 ms duration frame in a cellular transmitter. FIG. 2 displays a signaling portion 205 and a data service portion 210 of the cellular transmitter. The signaling portion 205 may be capable of generating data blocks 212 that may be used to form short duration frames (such as a 5 ms duration frame) and data blocks 214 that may be used to form long transmission frames (such as a 20 ms duration frame). The data service 210 may be capable of generating data blocks 217 that may be used to form long transmission frames.

In the data multiplex layer 220 of the cellular transmitter, the data blocks are converted into transmission frames. A short duration data block (for example, data block 212) may be a high-urgency (or high priority) message and is used to form a short duration transmission frame 222. The short duration transmission frame 222 may or may not contain additional information, such as header information. In IS-2000, the short duration transmission frame 222 may be referred to as a MuxPDU (Packet Data Unit) of Type-4.

While a long duration data block (for example, data blocks 214 and 217) may be of moderate urgency (or priority) or may contain non-vital data (for example, data not crucial to the operation of the cellular network) and is used to form a long duration transmission frame 224. The long duration transmission frame 224 may include a header field 225, a data block from the signaling portion 226 and/or a data block from the data service portion 227. In IS-2000, the long duration transmission frame 224 may be referred to as a MuxPDU of type 1 or 2 or a Physical Layer FCH SDU (Fundamental Channel service data unit). Note that while the data blocks 226 and 227 are displayed as being approximately equal in size, there no such size restrictions are in place.

Figure 3A:
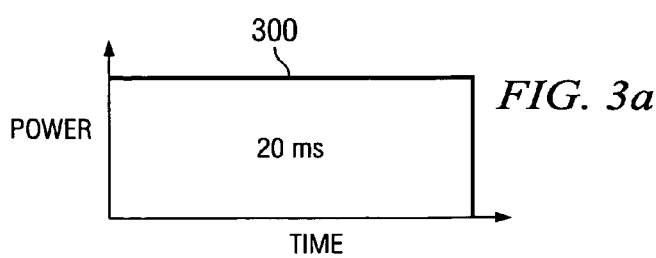
FIGS. 3a-3f are diagrams illustrating power-time diagrams of different combinations for the transmission of 5 and 20 ms duration frames.

With reference now to FIGS. 3a through 3f, there are shown power-time diagrams illustrating different combinations for the transmission of 5 and 20 ms duration frames, according to a preferred embodiment of the present invention. FIG. 3a illustrates a 20 ms duration frame 300 that has not been punctured by a 5 ms duration frame. Not shown are four 5 ms subframes in the 20 ms duration frame.

Figure 3B:
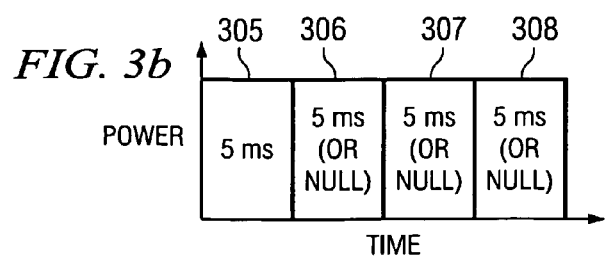

FIG. 3b illustrates a Type-4 5 ms duration frame 305 puncturing a 20 ms duration frame at a first 5 ms subframe. Additionally, three additional Type-4 5 ms duration frames 306, 307, and 308 which may or may not have punctured the 20 ms duration frame at a second, third, and fourth 5 ms subframe. If any or all of the three additional Type-4 5 ms duration frames 306, 307, and 308 are not present, then the transmitter (not shown) has an option of continuing with the transmission of the 20 ms duration frame or to not continue with the transmission of the 20 ms duration frame. If the transmitter chooses to not continue with the transmission of the 20 ms duration frame, the remainder of the 20 ms contains no data and may look like noise at the receiver.

Figure 3C:
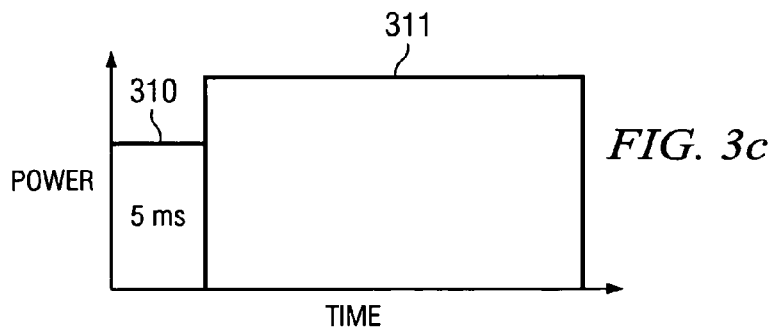
Figure 3D:
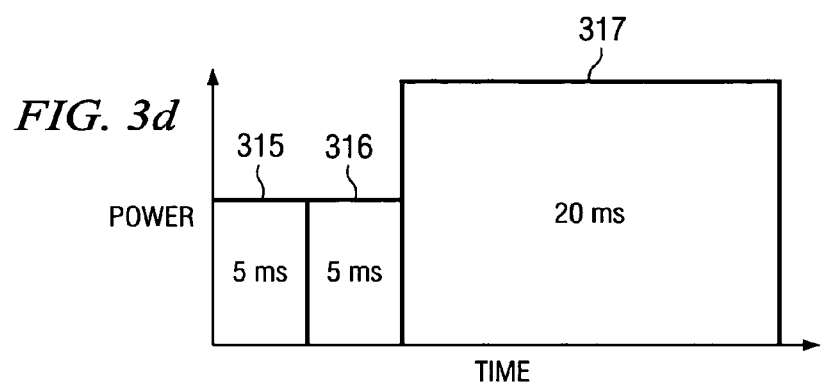

FIG. 3c illustrates a Type-4 5 ms duration frame 310 puncturing a 20 ms duration frame at a first 5 ms subframe and a remaining portion of the 20 ms duration frame 311 that is transmitted at an enhanced power level to help make up for the transmitted signal lost in the first 5 ms subframe. FIG. 3d illustrates two Type-4 5 ms duration frames 315 and 316 puncturing a 20 ms duration frame at a first and second 5 ms subframes and a remaining portion of the 20 ms duration frame 317 that is transmitted at an enhanced power level. Note that the transmitted power level of the remainder of the 20 ms duration frame 317 may be different (perhaps higher) than the power level of the remainder of the 20 ms duration frame 311 as displayed in FIG. 3c.

Figure 3E:
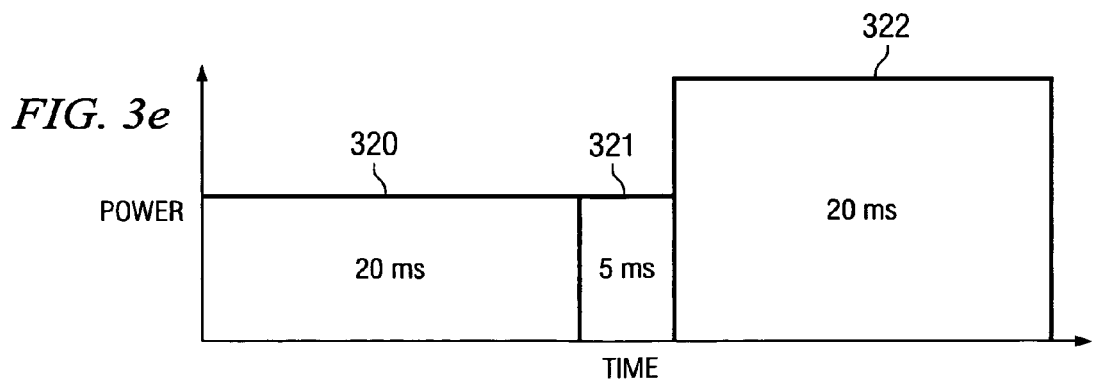

FIG. 3e illustrates a Type-4 5 ms duration frame 321 puncturing a 20 ms duration frame (displayed as a 5 ms duration subframe 320 and a 10 ms duration subframe 322). Note that since the Type-4 5 ms duration frame 321 punctured the 20 ms duration frame after the initial 5 ms subframe 320 was transmitted, its transmit power level is not increased to compensate for the loss of the second 5 ms subframe (taken by the Type-4 5 ms duration frame 321). Instead, the remaining 10 ms of the 20 ms duration frame (represented by the 10 ms duration subframe 322) is transmitted at a higher power level.

Figure 3F:
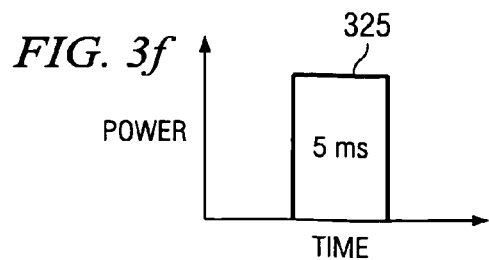

Finally, FIG. 3f illustrates a transmission in discontinuous transmission mode (DTX). In discontinuous transmission mode, rather than puncturing a 20 ms duration frame with one or more 5 ms duration frames, the transmission of the 20 ms duration frame is stopped altogether. As displayed in FIG. 3f, a single Type-4 5 ms duration frame 325 is transmitted in a time span allocated for an entire 20 ms duration frame.

Figure 4:
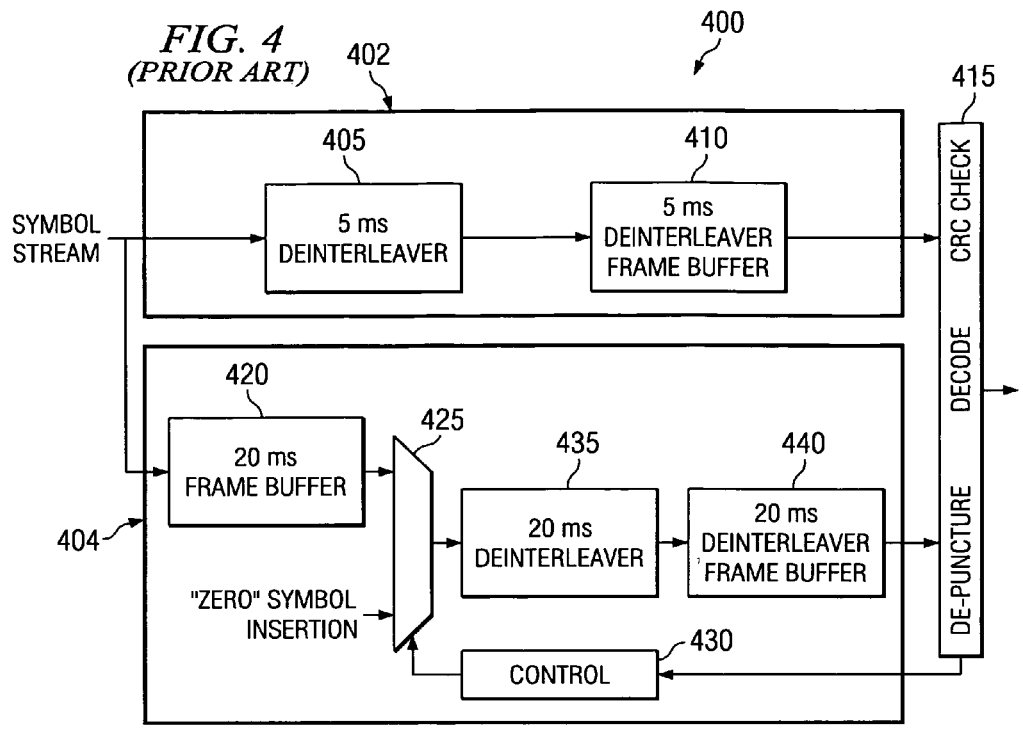
FIG. 4 is a diagram illustrating a prior art implementation of a deinterleaver and a Rate matching-Decode-CRC check (RDC) unit of a receiver that is capable of receiving and processing transmissions wherein there is a first standard frame duration and a second standard frame duration that may puncture the first standard frame duration without notification and/or warning.

With reference now to FIG. 4, there is shown a block diagram illustrating a prior art implementation of a deinterleaver and a rate matching-decode-CRC check (RDC) unit 400 (or simply deinterleaver-RDC) of a receiver that is capable of receiving and processing transmissions wherein there is a first standard frame duration and a second standard frame duration that may puncture the first standard frame duration without notification and/or warning. The deinterleaver-RDC 400 of the receiver as displayed in FIG. 4 may serve to reorganize the data that the receiver receives into a proper order. This is often necessary since many transmitters interleave their transmissions so that an error (or glitch or noise) will not readily damage several adjacent data bits. The deinterleaver-RDC's position in the receiver is after a portion of the receiver that is responsible for detecting the transmitted signal (perhaps via an antenna (not shown)), any analog circuitry (again not shown) to help filter and amplify the received signal to help attenuate any noise that is present in the environment of the receiver and the transmission and enhance a signal portion of the received signal, and a RAKE receiver (not shown) to convert the chip signal into a symbol stream.

The symbol stream is provided simultaneously to two different circuits, each designed to handle one of two different frame rate durations. The symbol stream is provided to a 5 ms duration frame deinterleaver section 402 and a 20 ms duration frame deinterleaver section 404.

Since the deinterleaver-RDC 400 is under the assumption that the symbol stream is made up of 5 ms duration frames, the 5 ms duration frame deinterleaver section 402 is relatively simple and includes a 5 ms duration frame deinterleaver 405 and a 5 ms duration frame deinterleaver frame buffer 410. The 5 ms duration frame deinterleaver 405 reorganizes (deinterleaves) the data in a 5 ms duration frame and places the data back in a correct order while the 5 ms duration frame deinterleaver frame buffer 410 may be a memory to store the reorganized 5 ms duration frame.

Although the deinterleaver-RDC-400 guesses that the symbol stream is made up of 5 ms duration frames, the symbol stream may also include 20 ms duration frames. In fact, in a normal IS-2000 transmission, a majority of data frames are of the 20 ms variety. Additionally, since there is no indicator present to let the deinterleaver-RDC 400 know what particular frame format the currently received transmission is in, the deinterleaver-RDC 400 needs to simultaneously process the symbol stream as if it were also in the 20 ms duration frame format.

Therefore, while the deinterleaver-RDC 400 is actively deinterleaving and decoding the symbol stream with the assumption that it is in 5 ms duration frames, a 20 ms duration frame buffer in the 20 ms duration frame deinterleaver section 404 is storing the incoming symbol stream. The incoming symbol stream needs to be stored since if the deinterleaver-RDC 400 is incorrect in its assumption that the symbol stream is in a 5 ms duration frame format, then symbol stream would be lost if it were not saved. In addition to the 20 ms duration frame buffer 420 (used to store the incoming symbol stream), the 20 ms duration frame deinterleaver section 404 includes a multiplexor 425, a 20 ms duration frame deinterleaver 435 and a 20 ms duration frame deinterleaver frame buffer 440.

Since a 20 ms duration frame may actually include subframes that have been punctured by one or more 5 ms duration frames, the particular subframes that have been punctured need to be removed from the 20 ms duration frame. The multiplexor 425 provides a relatively easy way to remove the punctured subframes. The multiplexor 425, controlled by control hardware (controller 430), switches between the contents of the 20 ms duration frame buffer 420 and a "zero" symbol value depending on information provided by the controller 430. When the controller 430 indicates that a particular subframe has been punctured, then the multiplexor 425 would switch to produce the "zero" symbol value at its output. When the controller 430 indicates that a particular subframe has not been punctured, then the multiplexor 425 would switch to produce the contents of the particular subframe that has been stored in the 20 ms duration frame buffer 420. Note that the 20 ms duration frame deinterleaver 435 and the 20 ms duration frame deinterleaver frame buffer 440 operates in a manner that is similar to the 5 ms duration frame deinterleaver 405 and the 5 ms duration frame deinterleaver frame buffer 410.

The controller 430 receives information about which 5 ms subframes have been punctured from a rate matching, decode, and CRC (cyclic redundancy code) check (RDC) unit 415. The RDC unit 415 can determine if a particular 5 ms subframe has been punctured by performing a CRC check on the 5 ms subframe. If the CRC check is correct, then the RDC unit 415 determines that the 5 ms subframe had indeed been punctured. If the CRC check is incorrect, then the RDC unit 415 determines that the 5 ms subframe has not been punctured. This information is then provided to the controller 430. The use of CRC checks is considered to be widely known by those of ordinary skill in the art of the present invention.

As illustrated in FIG. 4, the deinterleaver-RDC 400 requires a significant amount of additional hardware when compared to a deinterleaver that supports a symbol stream with a single frame duration. For example, the deinterleaver-RDC 400 requires the presence of the 20 ms duration frame buffer 420 (which for a IS-2000 compliant device, is approximately 1536 words in size). Additional hardware requirements include additional control hardware (such as the controller 430 and the multiplexor 425), glue logic (not shown), memory interfaces (not shown), and so forth.

Figure 5:
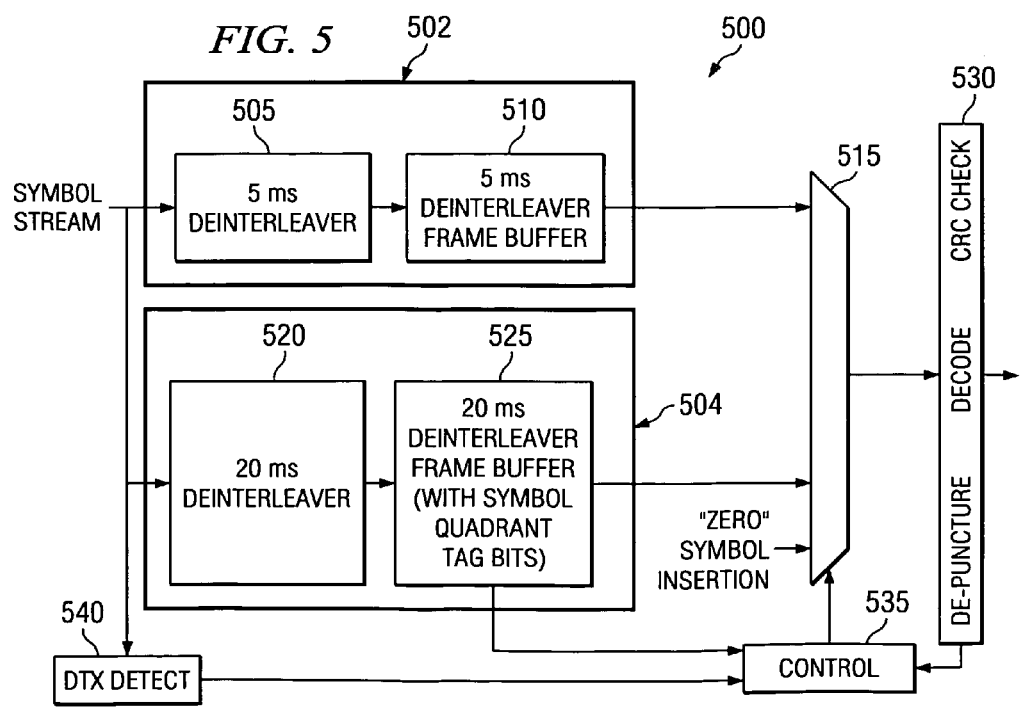
FIG. 5 is a diagram illustrating an implementation of a deinterleaver and a Rate matching-Decode-CRC check (RDC) unit of a receiver that is capable of decoding data frames of several different durations, wherein one or more data frames of a shorter duration is punctured into a data frame of a longer duration, according to a preferred embodiment of the present invention.

With reference now to FIG. 5, there is shown a block diagram illustrating a deinterleaver-RDC 500 capable of decoding data frames of several different durations, wherein one or more data frames of a short duration is punctured into a data frame of longer duration, according to a preferred embodiment of the present invention. Similar to the deinterleaver-RDC 400 (FIG. 4), the deinterleaver-RDC 500 receives a symbol stream from receiver circuitry (not shown) that is responsible for receiving the transmitted signal, filtering and amplifying the received signal, and converting the chip signal to symbol stream amongst other things.

Unlike the deinterleaver-RDC 400, the deinterleaver-RDC 500 is designed so that it may simultaneously deinterleave the symbol stream as if it was made up of 5 ms duration frames and 20 ms duration frames. To accomplish this, the deinterleaver-RDC 500 features a 5 ms duration frame deinterleaver unit 502 and a 20 ms duration frame deinterleaver unit 504, with both units operating in parallel. By operating both deinterleaver units in parallel, the deinterleaver-RDC 500 does not need to buffer the symbol stream as the deinterleaver-RDC 400 needed to do. Outputs from the 5 ms duration frame deinterleaver unit 502 and the 20 ms duration frame deinterleaver unit 504 are provided to a multiplexor 515 that permits the selection of the proper output, wherein the proper output is once again determined by the evaluation of CRCs by a rate matching, decode, and CRC check (RDC) unit 530.

After a completed reception of a 5 ms subframe, the 5 ms duration frame deinterleaver unit 502 produces a deinterleaved 5 ms duration data frame that is provided to the RDC unit 530 by the multiplexor 515. Note that the operation of the 5 ms duration frame deinterleaver unit 502 is similar to the operation of the 5 ms duration frame deinterleaver unit 402 (FIG. 4) and will not be discussed in this section. Refer to FIG. 4 for description of the 5 ms duration frame deinterleaver unit 402. The RDC unit 530 performs a CRC check on the 5 ms duration data frame, and if the CRC check succeeds, the RDC unit 530 knows that the 5 ms duration data frame that it has just checked is indeed a 5 ms duration data frame. This information is provided to a controller 535 by the RDC unit 530.

Operating in parallel with the 5 ms duration frame deinterleaver unit 502 is the 20 ms duration frame deinterleaver unit 504. The 20 ms duration frame deinterleaver unit 504 includes a 20 ms duration frame deinterleaver 520 and a 20 ms duration frame deinterleaver frame buffer 525. As the symbols from the symbol stream arrive at the 20 ms duration frame deinterleaver unit 504, the symbols are deinterleaved and placed in their proper positions in the 20 ms duration frame deinterleaver frame buffer 525. In addition to storing the deinterleaved symbols, the 20 ms duration frame deinterleaver frame buffer 525 stores location bits with each symbol. The location bits specify the original location of the deinterleaved symbol in the 20 ms duration frame. For example, with the 20 ms duration frame being partitioned into four 5 ms subframes, the location bits specify which one of the four 5 ms subframes the deinterleaved symbol was transmitted in. Note that since there are four 5 ms subframes, there may be two location bits per deinterleaved symbol stored in the 20 ms duration frame deinterleaver frame buffer 525. The location bits are sometimes referred to as quadrant bits. In general, if there are N subframes, then there may be $\log_2 N$ location bits.

The location (quadrant) bits may be used in the following manner: after the deinterleaving of a complete 20 ms of symbols in a four 5 ms subframes, and if the RDC unit 530 determines that at least one of the four 5 ms subframes was not a 5 ms duration frame, then the RDC unit 530 will need to decode the 20 ms duration frame. The RDC unit 530 may provide to the controller 535 just four indicator bits (with each bit representing one of the four 5 ms subframes and the value of the bit indicating whether or not the 5 ms subframe contains a 5 ms duration frame) or a list of the 5 ms subframes that are 5 ms duration frames (the list may contain subframe numbers, with the number of entries possibly varying from zero—none of the 5 ms subframes contained 5 ms duration frames to four—all four of the 5 ms subframes contain 5 ms duration frame data (in which case, there is no 20 ms duration frame data to decode)). Based on this list, the controller 535 may switch from the outputs of the 20 ms duration frame deinterleaver unit 504 and a "zero" symbol signal to produce a stream of data to the RDC unit 530 representing the 20 ms duration frame data. According to a preferred embodiment of the present invention, for the location bits that corresponds to a 5 ms subframe that is on the list as containing 5 ms duration frame data, the controller 535 will provide "zero" symbols to the RDC unit 530. This effectively removes any 5 ms duration frame data from the 20 ms duration frame data that will be decoded by the RDC unit 530.

As an example, let a second 5 ms subframe from a 20 ms duration frame contain data from a 5 ms duration frame. Therefore, when the 20 ms duration frame data is being decoded by the DDC unit 530, the data in the second 5 ms subframe should be zeroed out. To accomplish this, the controller 535 uses the list of 5 ms duration frame data provided by the RDC unit 530. In the example, the list may contain a single entry, the second 5 ms subframe, which may be represented by a single number. Therefore, as the deinterleaved symbols are being dumped from the 20 ms duration data deinterleaver frame buffer 525, deinterleaved symbols with location (quadrant) bits corresponding to the second 5 ms subframe are being replaced with "zero" symbols by the multiplexer 515 switching between the output of the 20 ms duration data deinterleaver 504 and the "zero" symbol signal. The 20 ms duration frame data is then decoded and CRC checked by the RDC unit 530.

Finally, the deinterleaver-RDC 500 features a discontinuous transmission (DTX) detect circuit 540 that may be capable of turning off the 5 ms duration frame deinterleaver unit 502, the 20 ms duration frame deinterleaver unit 504, RDC unit 530, or all three units in order to reduce power consumption. The DTX detect circuit 540 senses the symbol stream and when, according to a preferred embodiment of the present invention, the DTX detect circuit 540 notes that the signal level may be approximately equal to or below a specified threshold (or the DTX circuit 540 may detect the signal level at approximately the receiver's noise floor), the DTX detect circuit 540 asserts a signal to the controller 535 to tell it to turn off one or both of the deinterleaver unit (502 and 504) and RDC unit accordingly. Then, when the DTX detect circuit 540 detects that the signal levels have risen back above the specified threshold, it may signal the controller 535 to turn the deinterleaver units back on. Alternatively, the deinterleaver units 502 and 504 or the controller 535 may be designed to that they automatically turn back on at a next frame boundary (either 5 ms or 20 ms).

Reductions in hardware, hardware complexity, and power consumption are not the only advantage of the present invention over existing prior art designs such as the design illustrated in FIG. 4. The present invention also offers better performance due to its shorter processing time for the 20 ms duration frames. This is achieved by the parallel deinterleaving of both the 5 ms and the 20 ms duration frames. This has a net effect of reducing a significant component of latency in the processing of the 20 ms duration frames, which happens to be the predominant type of data frame in IS-2000 compliant communications networks.

Figure 6:
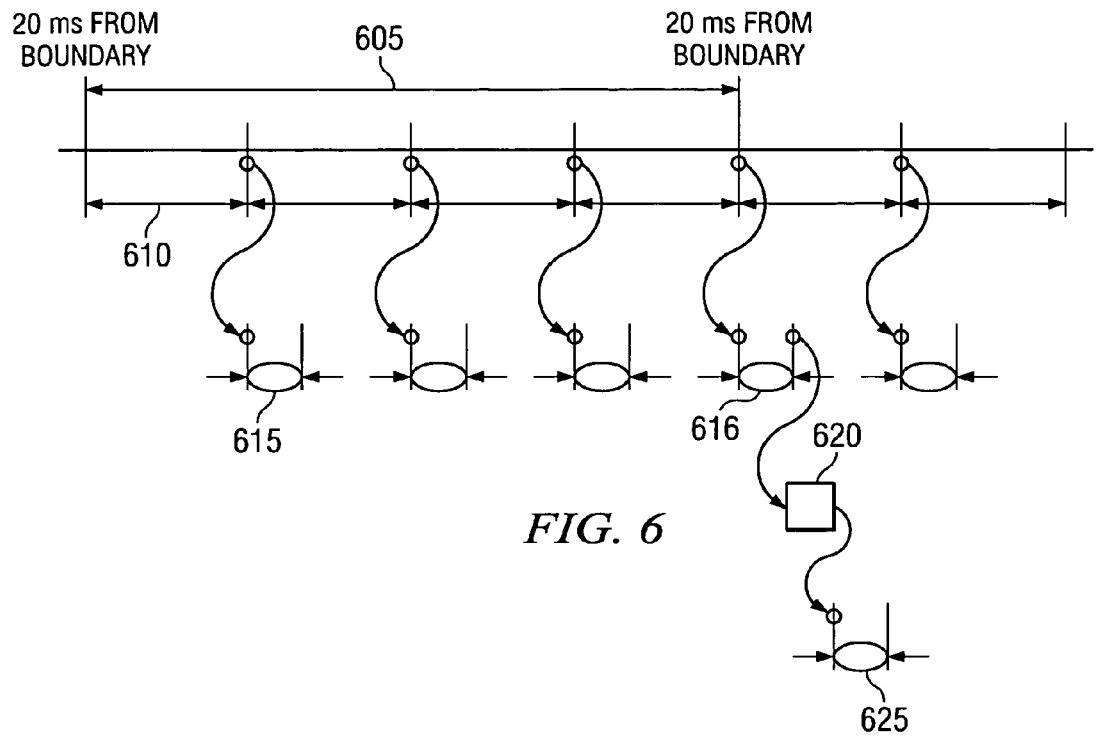
FIG. 6 is a diagram illustrating deinterleave and RDC processing time for the prior art implementation of a deinterleaver-RDC as displayed in FIG. 4.

With reference now to FIG. 6, there is shown a timing diagram illustrating processing time for the prior art deinterleaver-RDC displayed in FIG. 4. The timing diagram displays a 20 ms duration 605 that is in turn made up of four 5 ms durations (with an initial 5 ms duration labeled 610 and subsequent 5 ms durations unlabeled).

Taking a closer look at the initial 5 ms duration 610. It represents the arrival (including passage through a rake receiver and deinterleaver) of a first 5 ms subframe of a 20 ms duration frame. After the first 5 ms subframe is received and deinterleaved at the deinterleaver-RDC 400, a small period of time (displayed as highlight 615) is needed to process (including but not necessarily limited to rate match, decode and CRC check) the data contained in the 5 ms subframe as a 5 ms duration frame. Note that the RDC processing time can occur in parallel with the arrival (rake receiving and deinterleaving) of a second 5 ms subframe. Therefore, the overlapping of the RDC processing of the first 5 ms subframe and the arrival (rake receiving and deinterleaving) of the second 5 ms subframe is capable of hiding the RDC processing time. Note also that the processing (deinterleaving) of the first 5 ms subframe may occur essentially simultaneously with the completion of the reception (rake receiving) of the first 5 ms subframe.

The processing of a just received subframe and the reception of a subsequent subframe continues until the deinterleaver-RDC 400 receives all four 5 ms subframes. At this point, the RDC processing of a fourth 5 ms subframe begins (displayed as highlight 616) while the deinterleaver-RDC 400 begins the reception of a first 5 ms subframe of a new 20 ms duration frame.

After the fourth 5 ms subframe has been RDC processed (highlight 616), it is then possible to determine if the 20 ms of frame data received (the four 5 ms subframes) contained any 20 ms duration frame data. This may be determined by checking the CRC of each of the four 5 ms subframes (this may have been performed during the processing of each of the four 5 ms subframes). If any of the four CRC checks fail, then 20 ms of frame data contains at least some 20 ms duration frame data and needs to be processed as a 20 ms duration frame.

However, since up to now, the deinterleaver-RDC 400 has only buffered the 20 ms duration frame data, the 20 ms duration frame buffer 420 (FIG. 4) needs to be dumped, "zero" symbols inserted (if needed), and the symbols stored therein should be deinterleaved (20 ms duration frame deinterleaver 435 (FIG. 4)). This processing time is displayed in FIG. 6 as post-deinterleaving processing delay 620. Once the post-deinterleaving processing delay 620 completes the 20 ms duration frame data may be RDC processed (displayed as highlight 625). Note that while the individual amount of time that is represented by a single post-deinterleaving processing delay 620 may be small; it is present each time a 20 duration frame is processed. Therefore, a significant amount of delay may be inserted into the receiver.

Figure 7:
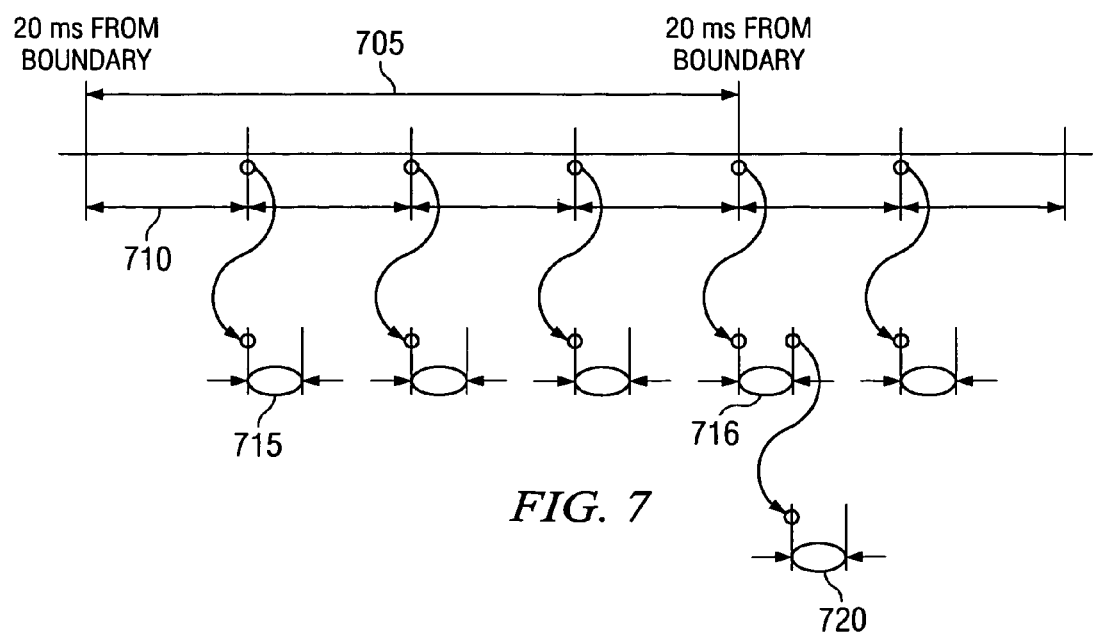
FIG. 7 is a diagram illustrating deinterleave and RDC processing time for the present invention of a deinterleaver-RDC as displayed in FIG. 5.

With reference now to FIG. 7, there is shown a timing diagram illustrating processing time for the deinterleaver-RDC displayed in FIG. 5, according to a preferred embodiment of the present invention. FIG. 7 displays a timing diagram that is similar in appearance to the timing diagram displayed in FIG. 6. Initially, the processing of 5 ms subframes appears identical to the processing of 5 ms subframes displayed in FIG. 6. It is only after the completion of the reception of a 20 ms duration frame that the differences appear.

After the completed reception of a 20 ms duration frame, a fourth 5 ms subframe is RDC processed (displayed as highlight 716). If the 20 ms duration frame is determined to contain at least some 20 ms duration frame data, then the RDC processing of the 20 ms duration frame (displayed as highlight 720) may begin immediately after the completion of the RDC processing of the fourth 5 ms subframe. This is possible due to the parallel operation of the 5 ms duration frame deinterleaving unit 502 (FIG. 5) and the 20 ms duration frame deinterleaving unit 504 (FIG. 5). Because the 20 ms duration frame deinterleaving unit 504 is operating while the symbol stream is being received, the symbols are being deinterleaved (by the 20 ms duration frame deinterleaver 520) and stored (by the 20 ms duration frame deinterleaver frame buffer 525). Therefore, the deinterleaved 20 ms duration frame data is ready to be RDC processed as soon as it is determined that there is 20 ms duration frame data.

With reference now to FIG. 8, there is shown a flow diagram illustrating a process 800 for use in the control of a deinterleaver and a RDC unit with the capability to deinterleave data frames of a first duration which may contain data frames of a second shorter duration punctured into the data frame of the first duration, according to a preferred embodiment of the present invention. The process 800 begins by configuring a deinterleaver (for example, the deinterleaver-RDC 500 (FIG. 5) to deinterleave an incoming symbol stream from the rake receiver as if it were made up of 5 ms duration frames and 20 ms duration frames (block 810). The deinterleaver-RDC 500 has separate deinterleavers for 5 ms and 20 ms duration frames that may be configured to operate in parallel of one another. So both deinterleavers may be able to deinterleave the symbol stream simultaneously.

While the deinterleavers are deinterleaving the symbol stream, the process 800 checks for the appearance of a 5 ms frame boundary (block 815). If a 5 ms frame boundary is not detected, the deinterleaving continues. Once a 5 ms second frame boundary is detected, the process 800 may perform rate matching, decoding and a CRC checking on the 5 ms duration frame data (block 820). Note that both the CRC check and the data decoding may be performed in the RDC unit 530 (FIG. 5).

The CRC from each 5 ms duration frame may then be passed to the controller 535, perhaps along with other information, such as a number corresponding to a 5 ms subframe that contains the 5 ms duration data (also block 820). The process 800 may then proceed to check to see if it has received an entire 20 ms duration frame of data (block 825). This may be accomplished by counting the number of 5 ms subframes received (there are four 5 ms subframes in one 20 ms duration frame of data) or counting the amount of time elapsed since the last complete 20 ms duration frame of data was received. If an entire 20 ms duration frame of data has not been received, then the deinterleaving of the symbol stream continues in block 810.

If an entire 20 ms duration frame of data has been received, then the process 800 first checks the validity of the 5 ms CRCs (block 830). If all of the 5 ms CRCs are valid, then the entire 20 ms duration frame contained 5 ms duration frame data and no 20 ms duration frame data and the process may return to block 810 to deinterleave more data. If not all of the 5 ms CRCs are valid, then the process 800 may use information provided to it by the RDC unit 530 to control the multiplexor 515 by using the controller 535 to dump the deinterleaved symbols from the 20 ms duration frame deinterleaver frame buffer 525, complete with "zero" symbols for particular subframes that actually were 5 ms duration frame data and not 20 ms duration frame data (block 835) and the data may then be decoded in the RDC unit 530 (Block 840). Note that while the 5 ms duration frame data and/or the 20 ms duration frame data are being decoded by the RDC unit 530, the deinterleaver-RDC 500 may be receiving and deinterleaving symbol data in parallel.

Although the above description focus upon data that are in a frame format with durations of 5 and 20 ms, the present invention is capable of operating with frame formats of various durations. For example, 10 and 30 ms, 15 and 60 ms, and so forth.

With reference now to FIG. 9, there is shown a block diagram illustrating a high-level view of a wireless receiver 900, wherein the wireless receiver 900 features a deinterleaver 920 capable of deinterleaving a symbol stream that may contain punctured data frames without any frame duration indicators or flags, according to a preferred embodiment of the present invention. As displayed in FIG. 9, the wireless receiver 900 may be a part of a wireless device that is usable in a wireless communications network, such as an IS-2000 compliant network. The wireless receiver 900 includes an antenna 905 that detects transmitted signals that are transmitted over-the-air and an analog signal processing unit 910. The analog signal processing unit 910 is responsible for performing tasks such as filtering and amplifying the received signal.

The output of the analog signal processing unit 910 is then provided to a rake receiver that converts the chip signal into a symbol stream. The symbol stream is then deinterleaved by the deinterleaver 920 in a fashion similar to that discussed above, producing a deinterleaved symbol stream that is processed by a RDC unit 925. The RDC unit 925 may perform rate matching, decoding, error detecting, error correcting, and so forth on the deinterleaved symbol stream and produce decoded data that is usable by digital devices (not shown) connected to the receiver 900. Note that in some implementations, the deinterleaver 920 and the RDC 925 may be implemented in a single block. Examples of digital devices may include but are not limited to: computers, cellular telephones, personal digital assistants, video and audio devices such as recorders and players, multimedia devices, and so forth.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for deinterleaving a data stream received in an electronic apparatus, wherein the data stream can be partitioned into portions of a first and second size, wherein there are M portions of the first size in a portion of the second size, the method comprising:
    deinterleaving a portion of the first size of the data stream at a first and a second frame duration;
    determining if the portion of the first size of the data stream deinterleaved with the first frame duration is valid;
    repeating the deinterleaving and determining until M portions of the first size has been received; and
    decoding the M portions of the first size as a data frame of the second frame duration if any of the M portions of the first size was determined to be invalid.

2. The method of claim 1, wherein the deinterleaving of the portion at the first and second frame duration occurs in parallel.

3. The method of claim 1 further comprising replacing portions of the first size in the second decoding if these portions of the first size were determined to be valid.

4. The method of claim 3, wherein the replacing comprises replacing deinterleaved symbols with zero symbols.

5. The method of claim 3, wherein portions of the first size in the second decoding are maintained if these portions of the first size were determined to be invalid.

6. The method of claim 1, wherein the second decoding decodes the M portions of the first size simultaneously.

7. The method of claim 1 further comprising decoding the portion of the first size as a data frame of the first frame duration if the portion of the first size is valid.

8. The method of claim 1, wherein a portion of the first size is smaller than a portion of the second size.

9. The method of claim 8, wherein a portion of the first size is equivalent to 5 milliseconds of transmitted data.

10. The method of claim 9, wherein a portion of the second size is equivalent to 20 milliseconds of transmitted data.

11. The method of claim 10, wherein M is equal to four (4).

12. The method of claim 1, wherein the electronic apparatus is a wireless device.

13. A circuit comprising:
    a symbol stream input;
    first deinterleaver unit coupled to the symbol stream input, the first deinterleaver unit containing circuitry to deinterleave symbols from the symbol stream at a first frame duration rate;
    second deinterleaver unit coupled to the symbol stream input, the second deinterleaver containing circuitry to deinterleave symbols from the symbol stream at a second frame duration rate;
    a decode unit coupled to the first and second deinterleaver units, the decode unit containing circuitry to determine the integrity of a data frame provided by the first and second deinterleaver units;
    a multiplexor having a first input coupled to the first deinterleaver unit and a second input coupled to the second deinterleaver unit and an output coupled to the decode unit, the multiplexor to selectively couple outputs from the first and the second deinterleaver units to the decode unit; and
    a controller having an input coupled to the decode unit and an output coupled to the multiplexor, the controller to provide control signals to selectively switch the multiplexor.

14. The circuit of claim 13, wherein the multiplexor having a third input coupled to a zero symbol signal line, wherein the controller selectively switches the zero symbol signal line to the decode unit when a portion of an output provided by the second deinterleaver unit contains symbols transmitted at the first frame duration rate, and wherein the symbols transmitted at the first frame duration rate is to be eliminated.

15. The circuit of claim 13 further comprising a discontinuous transmission mode detector having an input coupled to the symbol stream input and an signal flag line coupled to the controller, the discontinuous transmission mode detector containing circuitry to detect when symbols are absent from the symbol stream and assert a signal flag line to the controller.

16. The circuit of claim 15, wherein the controller shuts down operations of the first and second deinterleaver units when the signal flag line is asserted by the discontinuous transmission mode detector.

17. The circuit of claim 15, wherein the controller shuts down operation of the second deinterleaver unit when the signal flag line is asserted by the discontinuous transmission mode detector.

18. The circuit of claim 15, wherein the controller shuts down operation of the first deinterleaver unit when the signal flag line is asserted by the discontinuous transmission mode detector.

19. The circuit of claim 13, wherein the circuit is implemented in a receiver in a wireless device.

20. A circuit comprising:
    a symbol stream input;
    a first deinterleaver unit coupled to the symbol stream input, the first deinterleaver unit containing circuitry to deinterleave symbols from the symbol stream at a first frame duration rate;
    a second deinterleaver unit coupled to the symbol stream input, the second deinterleaver containing circuitry to deinterleave symbols from the symbol stream at a second frame duration rate, wherein the first frame duration is shorter than the second frame duration; and
    a decode unit coupled to the first and second deinterleaver units, the decode unit containing circuitry to determine the integrity of a data frame provided by the first and second deinterleaver units.

21. The circuit of claim 20, wherein the second frame duration is an integer multiple of the first frame duration.

22. The circuit of claim 20, wherein the circuit is implemented in a receiver in a wireless device.

23. The circuit of claim 20, wherein the circuit is implemented in a receiver in a wireless device.

24. A receiver comprising:
a signal source;
an analog processing circuit coupled to the signal source, the analog processing circuit containing circuitry to filter and amplify a signal provided by the signal source and produce received data;
a deinterleaver unit coupled to the analog processing circuit, the deinterleaver unit containing circuitry to deinterleave an output of the analog processing circuit and produce a deinterleaved symbol stream, wherein the received data may contain punctured data wherein the deinterleaver unit comprises:
a first deinterleaver unit coupled to the analog processing circuit, the first deinterleaver unit containing circuitry to deinterleave data from the received data at a first frame duration rate; and
a second deinterleaver unit coupled to the symbol stream input, the second deinterleaver containing circuitry to deinterleave data from the received data at a second frame duration rate;
a multiplexor having a first input coupled to the first deinterleaver unit and a second input coupled to the second deinterleaver unit and an output coupled to the RDC circuit, the multiplexor to selectively couple outputs from the first and the second deinterleaver units to the RDC circuit; and
a controller having an input coupled to the RDC circuit and an output coupled to the multiplexor, the controller to provide control signals to selectively switch the multiplexor; and
a rate match, decode, and CRC check (RDC) circuit coupled to the deinterleaver unit, the digital processing circuit containing circuitry to decode, error detect, and error correct the deinterleaved symbol stream to produce a digital data stream.

25. The receiver of claim 24, wherein the multiplexor having a third input coupled to a zero data signal line, wherein the controller selectively switches the zero data signal line to the RDC circuit when a portion of an output provided by the second deinterleaver unit contains received data transmitted at the first frame duration rate, and wherein the received data transmitted at the first frame duration rate is to be eliminated.

26. The receiver of claim 24, wherein the deinterleaver unit further comprises a discontinuous transmission mode detector having an input coupled to the received data input and an output coupled to the controller, the discontinuous transmission mode detector containing circuitry to detect when data is absent from the received and assert a signal flag line to the controller.

27. The receiver of claim 24, wherein the receiver operates in a wireless communications network.

28. The receiver of claim 27, wherein the wireless communications network is a CDMA-2000 compliant network.

29. The circuit of claim 24, wherein the receiver is implemented in a wireless device.

30. The circuit of claim 29, wherein the wireless device is one of the group of: a cellular telephone, pager; computer; personal digital assistant.

31. A circuit, comprising
a symbol stream input;
a first deinterleaver unit coupled to the symbol stream input, the first deinterleaver unit containing circuitry to deinterleave symbols from the symbol stream at a first frame duration rate;
a second deinterleaver unit coupled to the symbol stream input, the second deinterleaver containing circuitry to deinterleave symbols from the symbol stream at a second frame duration rate;
a decode unit coupled to the first and second deinterleaver units, the decode unit containing circuitry to determine units; and
a multiplexor having a first input coupled to the first deinterleaver unit and a second input coupled to the second deinterleaver unit and an output coupled to the decode unit, the multiplexor to selectively couple outputs from the first and the second deinterleaver units to the decode unit.

* * * * *